(12) United States Patent
Vollet

(10) Patent No.: US 7,731,444 B2
(45) Date of Patent: Jun. 8, 2010

(54) DEVICE FOR COUPLING A PLASTIC PART AND A BODY SHELL STRUCTURE

(75) Inventor: Ludovic Vollet, Versailles (FR)

(73) Assignee: Renault S.A.S., Boulogne Billancourt (FR)

( * ) Notice: Subject to any disclaimer, the term of this patent is extended or adjusted under 35 U.S.C. 154(b) by 185 days.

(21) Appl. No.: 10/495,430

(22) PCT Filed: Nov. 30, 2001

(86) PCT No.: PCT/FR01/03794

§ 371 (c)(1),
(2), (4) Date: May 17, 2005

(87) PCT Pub. No.: WO03/045766

PCT Pub. Date: Jun. 5, 2003

(65) Prior Publication Data

US 2005/0214065 A1  Sep. 29, 2005

(51) Int. Cl.
*F01D 5/02* (2006.01)
*B60R 19/02* (2006.01)

(52) U.S. Cl. .................. 403/109.3; 403/28; 293/102; 293/137

(58) Field of Classification Search ............. 403/109.3, 403/28–30; 293/137, 155, 138, 102; 267/158, 267/163–165; 24/292–295, 297
See application file for complete search history.

(56) References Cited

U.S. PATENT DOCUMENTS

| 4,118,611 | A | * | 10/1978 | Harris | .................. 200/408 |
| 4,145,077 | A | * | 3/1979 | Haberle et al. | .............. 293/102 |
| 5,010,219 | A | * | 4/1991 | Kato | .................. 200/408 |
| 5,098,765 | A | * | 3/1992 | Bien | .................. 293/155 |
| 6,290,272 | B1 | * | 9/2001 | Braun | .................. 293/120 |

FOREIGN PATENT DOCUMENTS

| EP | 0799758 | 10/1997 |
| EP | 1070639 | 1/2001 |

* cited by examiner

*Primary Examiner*—Victor MacArthur
(74) *Attorney, Agent, or Firm*—Oblon, Spivak, McClelland, Maier & Neustadt, L.L.P.

(57) ABSTRACT

A system to couple a plastic part and a body structure includes a plate and an elastic member as part of the body structure. Additionally, the plastic part includes an opening and an oblique stop at an end of the opening. The plate is received within the opening. The elastic member includes a first end that is free and a second end that is fixed to the plate. The elastic member biases the plate with respect to the plastic part. In a first position, the first end of the elastic member contacts the oblique stop. In a second position, the first end of the elastic member contacts the oblique stop such that the first end of the elastic member is displaced in a vertical direction and a horizontal direction compared to the first position. Additionally, the elastic member is slideable along the oblique stop.

11 Claims, 2 Drawing Sheets

DEVICE FOR COUPLING A PLASTIC PART AND A BODY SHELL STRUCTURE

BACKGROUND OF THE INVENTION

I. Field of the Invention

The invention relates to a device for fixing a plastic fender on the body of a vehicle.

More particularly, it relates to a device for fixing a plastic fender whose coefficient of expansion is greater than that of the support to which it is attached.

II. Discussion of the Background

During fixation of plastic fenders to bodies, it is necessary to allow for the different natures of the materials assembled, because they can react in very different ways under certain temperature conditions. Their assembly must not be accomplished to the detriment of one of them, which would be at risk of deterioration. This is particularly true during a cataphoresis treatment, in which the plastic fender undergoes much greater expansion than the body structure. The fixation devices must then provide space for displacement of the plastic fender.

At present, the devices for fixation of a plastic fender may be composed of a plate to be placed in an opening known as a slot, provided for the purpose. The plate is able to slide longitudinally into this slot as a function of the displacement of the fender relative to the body structure, and elastic means are provided for retracting the plate into its initial position. However, these devices limit the expansion of the plastic fender to the length of the slot created therein.

French Patent 2747091 describes a sliding fixation device for a plastic fender wherein elastic means cooperate with the fixation element in an equilibrium position, in such a way that the clearance of the element is limited by the borders of the slot. In addition, the forces exerted against the plate during expansion are so large than they can block the spring element.

SUMMARY OF THE INVENTION

To this end, the invention relates to a device for fixation of a plastic part on a body structure, the device comprising a plate that can move in an opening created in the plastic fender and an elastic means with which the plate can be retracted along the longitudinal axis into the opening.

According to one characteristic of the invention, the slot created in the plastic part is provided at least on one of its widths with an oblique stop that cooperates with the elastic means.

According to another characteristic, the elastic means is a spring.

According to another characteristic, the length of the opening provided for sliding of the plate is at least equal to the length of the plate plus the expansion distance.

According to another aspect of the invention, the recesses intended to receive the projections of the plate define the lower and upper limits of the stop.

Another characteristic is that the spring, when in rest position, is affixed on that side of the stop whose base defined by the recesses is the broadest.

BRIEF DESCRIPTION OF THE DRAWINGS

Other characteristics and advantages of the invention will become evident upon reading the description of practical examples of a device for fixation of a plastic part to the body structure in the attached drawings, wherein.

DETAILED DESCRIPTION OF THE INVENTION

Figure 1:
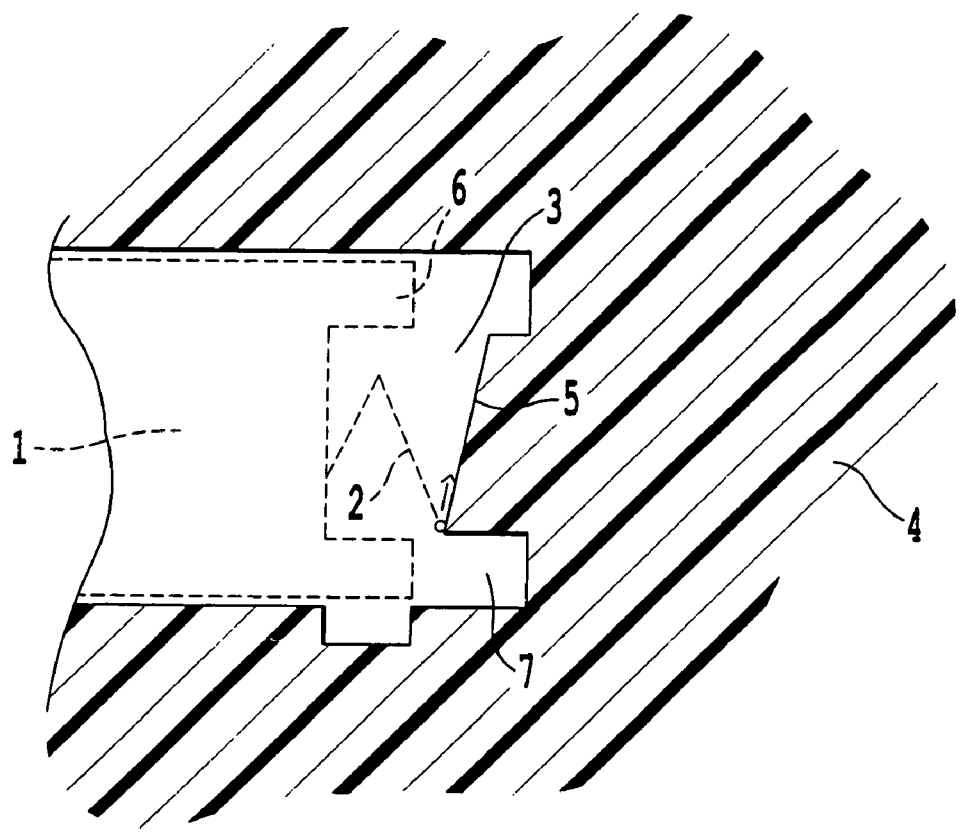
FIG. 1 illustrates a front view of the plate inserted in the slot in normal position, with the spring compressed under minimal load.

FIG. 1 corresponds to the equilibrium position of plate 1 when it is not being subjected to any treatment capable of deforming it. Spring 2 exerts a maintaining force between the plate and the contour of slot 3 of plastic fender 4. Spring 2 is braced at one of its ends on plate 1 and at its other end on the edge of the slot formed by an oblique stop 5. The length of slot 3 is at least equal to that of plate 1 plus that of the expansion distance during cataphoresis treatments or during exposure to strong sunlight.

Furthermore, the width of plate 1 is adapted to that of slot 3 in such a way as to slide therein without jamming. The sliding is guided by the longitudinal edges of the slot, which are the supports of the groove of the movable plate. For one of the grooves, the only function is to permit sliding; the other groove is a notch formed by the toe, and it has the additional function of introducing the plate into the slot.

During manufacture, the spring and the plate are made in the same mold, into which the screw is inserted. After the product has been injected, a cooling time is necessary in order to eject the molded article. To this end, the plate is provided with four projections 6, two of which are shown. By means of these projections, the part can be thrust out of the mold without suffering deformation, even though it is still fragile. Recesses 7, intended to receive projections 6 of the plate when the fender has been subjected to expansion, are made in the slot. They define the lower and upper limits of the edges of stop 5. Furthermore, the projections add a guiding and stabilizing length during expansion of the part.

When the device is in rest position, the spring is compressed under minimal load, and one of its ends is braced on the face of the stop where the base is largest. The spring occupies the space calculated for expansion.

Figure 2:
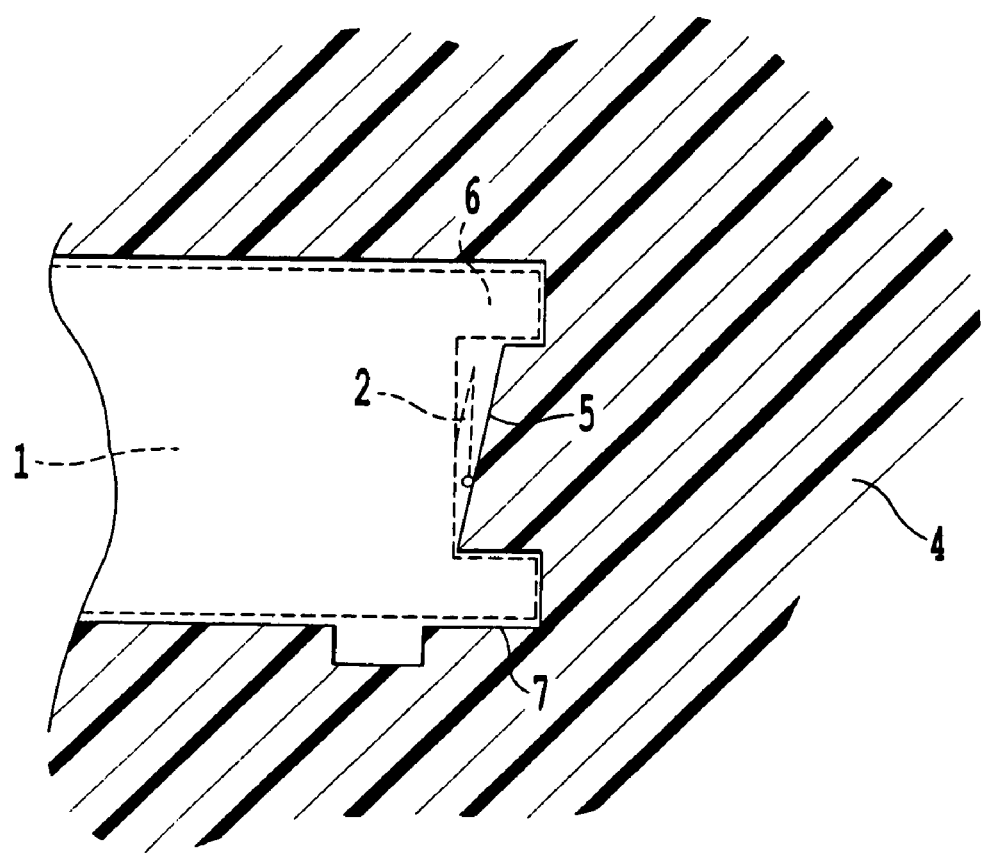
FIG. 2 illustrates the position of the plate when the plastic fender has undergone expansion due to a temperature change.

FIG. 2 illustrates the device when the plastic fender is undergoing expansion due to heat.

Spring 2 is in compressed position, and projections 6 of plate 1 have slid into recesses 7 provided for this purpose. Since the spring travel of spring 2 is larger than the length of projections 6 of the plate, this spring necessarily undergoes a vertical translational movement along the stop during compression. Since stop 5 is slanted, spring 2 can eventually be received in the space created by the oblique line of the stop, in such a way that it achieves longer travel as the projections are entering the recesses. During expansion, therefore, the spring becomes retracted at an inclination such that its end does not become jammed under one of the projections.

The invention claimed is:

1. A system, comprising:
    a plastic part including an opening, an oblique stop at an end of the opening, and the end of the opening defining at least two recesses on opposite sides of the oblique stop;
    a body structure coupled to the plastic part and including a plate configured to be received within the opening, the plate including at least two projections extending from a first end of the plate; and
    an elastic member including a first end that is free and a second end that is fixed to the plate at the first end of the plate, and the elastic member is configured to bias the plate with respect to the plastic part, wherein in a first position, the first end of the elastic member contacts a first part of the oblique stop and the first end of the elastic member extends further away from the first end of the plate in an axial direction of the opening than the at least two projections, in a second position, the first end of the elastic member contacts a second part of the oblique stop such that the first end of the elastic member is displaced with respect to the first part of the oblique stop in a vertical direction and a horizontal direction, the at least two projections extend further away from the first end of the plate in the axial direction of the opening than the first end of the elastic member and the at least two projections extend into the at least two recesses, the first end of the elastic member is slideable along the oblique stop from the first part to the second part, and the plastic part is a plastic fender and the body structure is a vehicle body of a vehicle.

2. A system according to claim 1, wherein the elastic member is a spring.

3. A system according to claim 2, wherein the spring, when in a minimal load position, is affixed on a side of the stop closest to the plate.

4. A system according to claim 1, wherein a length of the opening in the plastic part is at least equal to a length of the plate plus an expansion distance of the plastic part.

5. A system according to claim 1, wherein the opening includes the at least two recesses intended to receive the at least two projections of the plate and that define lower and upper limits of the stop.

6. A system according to claim 5, wherein the stop and the at least two recesses are located on the same end of the opening.

7. A system, comprising:

a plastic part defining a slot and including an oblique stop and at least two recesses on opposite sides of the oblique stop;

a body structure coupled to the plastic part and including a plate in the slot, the plate including at least two projections extending from a first end of the plate; and a deformable member including a free end and a fixed end attached to the first end of the plate, wherein the deformable member is positioned in the slot and between the plate and the plastic part, wherein before a temperature change of the plastic part, the free end of the deformable member bears against the plastic part at a first location on the plastic part and the free end of the deformable member extends further away from the first end of the plate in an axial direction of the slot than the at least two projections, after a temperature change of the plastic part, the free end of the deformable member bears against the plastic part at a second location on the plastic part, and the second location is different from the first location in an oblique direction with respect to the plastic part, the at least two projections extend further away from the first end of the plate in the axial direction of the slot than the first end of the elastic member and the at least two projections extend into the at least two recesses, and the plastic part is a plastic fender and the body structure is a vehicle body of a vehicle.

8. A system according to claim 7, wherein the deformable member is configured to slide between the first and second positions.

9. A system according to claim 7, wherein as the temperature of the plastic part changes, the deformable member moves from the first position to the second position, or as the temperature of the plastic part changes, the deformable member moves from the second position to the first position.

10. A system according to claim 7, wherein a surface of the plastic part between the first and second locations is an oblique surface.

11. A system according to claim 7, wherein the deformable member is a spring.

* * * * *